(12) United States Patent
Tsang

(10) Patent No.: US 7,409,537 B2
(45) Date of Patent: Aug. 5, 2008

(54) FAST BOOTING AN OPERATING SYSTEM FROM AN OFF STATE

(75) Inventor: Michael H. Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 11/245,629

(22) Filed: Oct. 6, 2005

(65) Prior Publication Data

US 2007/0083743 A1     Apr. 12, 2007

(51) Int. Cl.
*G06F 9/00* (2006.01)
*G06F 15/177* (2006.01)

(52) U.S. Cl. ............................. 713/1; 713/2; 713/100
(58) Field of Classification Search .................. 713/1
See application file for complete search history.

(56) References Cited

U.S. PATENT DOCUMENTS

| | | | |
|---|---|---|---|
| 6,098,158 A | 8/2000 | Lay et al. | |
| 2003/0233534 A1 * | 12/2003 | Bernhard et al. | ............... 713/1 |
| 2004/0003223 A1 | 1/2004 | Fortin et al. | |
| 2004/0153694 A1 | 8/2004 | Nicholson et al. | |
| 2006/0053270 A1 * | 3/2006 | Dunn et al. | ................... 712/13 |

FOREIGN PATENT DOCUMENTS

KR     1019990082741     11/1999

* cited by examiner

*Primary Examiner*—Thuan Du
*Assistant Examiner*—Michael J Brown
(74) *Attorney, Agent, or Firm*—Workman Nydegger

(57) ABSTRACT

Described is a fast boot mechanism that generally operates by persisting static data and/or code for a system component, and then providing the system component with access to the static data and/or code during a subsequent device boot. For example, the static data and/or code of one or more components may be restored from non-volatile memory to volatile memory, whereby subsequent reboots need not have the components re-compute their persisted static data, making subsequent reboots faster. A fast boot infrastructure may include an interface set, and provides first mechanism that persists static data and/or code for a system component, and a second mechanism that provides the system component with access to the static data and/or code. The fast boot infrastructure may also provide the component with a way to invalidate static data and/or code, along with a background mechanism that collects static data and/or code from the system component.

20 Claims, 7 Drawing Sheets

FAST BOOTING AN OPERATING SYSTEM FROM AN OFF STATE

BACKGROUND

As mobile devices become more popular, the demand for longer battery life and instant accessibility increases. With the complexity of a full operating system such as a Microsoft Windows®-based operating system, it is a significant challenge to meet that demand. For example, a typical mobile personal computer boots from an off state (e.g., corresponding to an S5 state according to the ACPI standard) in about twenty to forty seconds, which is clearly not considered to be an instantly accessible device.

Various mechanisms have been attempted to get a computer system back into operation more quickly. For example, an ACPI S3/Standby sleep state has been defined, in which system state is essentially suspended in the system memory, whereby reasonable instant-on performance is achieved. However, the S3 state consumes battery power, which is a concern to many users and device manufacturers, and for at least that reason makes using the S3 state a poor solution for many users. There is also a concern among some users and manufacturers that the S3 state may degrade over time, which is likely due to the various drivers and services, which are obtained from various development sources and that may be part of the critical resume code path.

An S4/Hibernate sleep state is also defined, which in general transfers system memory to a hard disk file to allow a system to wake somewhat more quickly, while also preserving data in the case of a power outage. The S4 sleeping state has the advantage of not consuming any power, but it shares the same stability and potential data loss concerns voiced for the S3 state. Further, an S4 resume still takes approximately fifteen seconds on the average, which also falls short of being considered "Instant-On" solution.

Even with desktop computer systems that are not battery powered, a quick power-on experience is becoming a much sought-after requirement. For example, as many computer systems are evolving towards providing entertainment, particularly home computer systems, there is an increased need to have computing devices act more like consumer electronics devices in order to sell computing products in the competitive computer and consumer electronics marketplace. For example, unlike the aforementioned time of twenty-to-forth seconds for a cold boot sequence, typical consumer electronic devices can be turned on and become functional within a few seconds.

In general, a faster boot from a fully off state is desirable for computer systems. Such a faster boot should be independent of and complimentary to other (e.g., S3 and S4) types of resume operations, because those sleep states preserve system states that are important in some user scenarios.

SUMMARY

Briefly, various aspects of the present invention are directed towards a fast boot mechanism that generally operates by persisting static data for a system component, and then providing the system component with access to the static data during a subsequent device boot. For example, after setup or installation, a fastboot image comprising the static data and possibly code of one or more components may be restored from non-volatile memory to volatile memory (e.g., RAM); for example, putting the boot code path into non-volatile memory has the advantage of bypassing the relatively slow spin up time of rotating media, e.g., a typical hard disk spin-up time can be as much as about five seconds. Upon subsequent reboots, each system component that persisted static data is provided with access to its corresponding static data, whereby much of the data need not be re-enumerated during each boot, making subsequent reboots faster.

A fast boot infrastructure is exemplified, including a first mechanism that persists static data and/or code for a system component at a first time, and a second mechanism that provides the system component with access to the static data at a second time that is after the first time and during a boot of the system device. The fast boot infrastructure may include an interface set by which the system component (client) may persist the static data and/or code, obtain access to the static data, and invalidate the static data (e.g., upon a change). The fast boot infrastructure may also employ background mechanism that collects the static data and/or code from the system component, such as following system boot.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
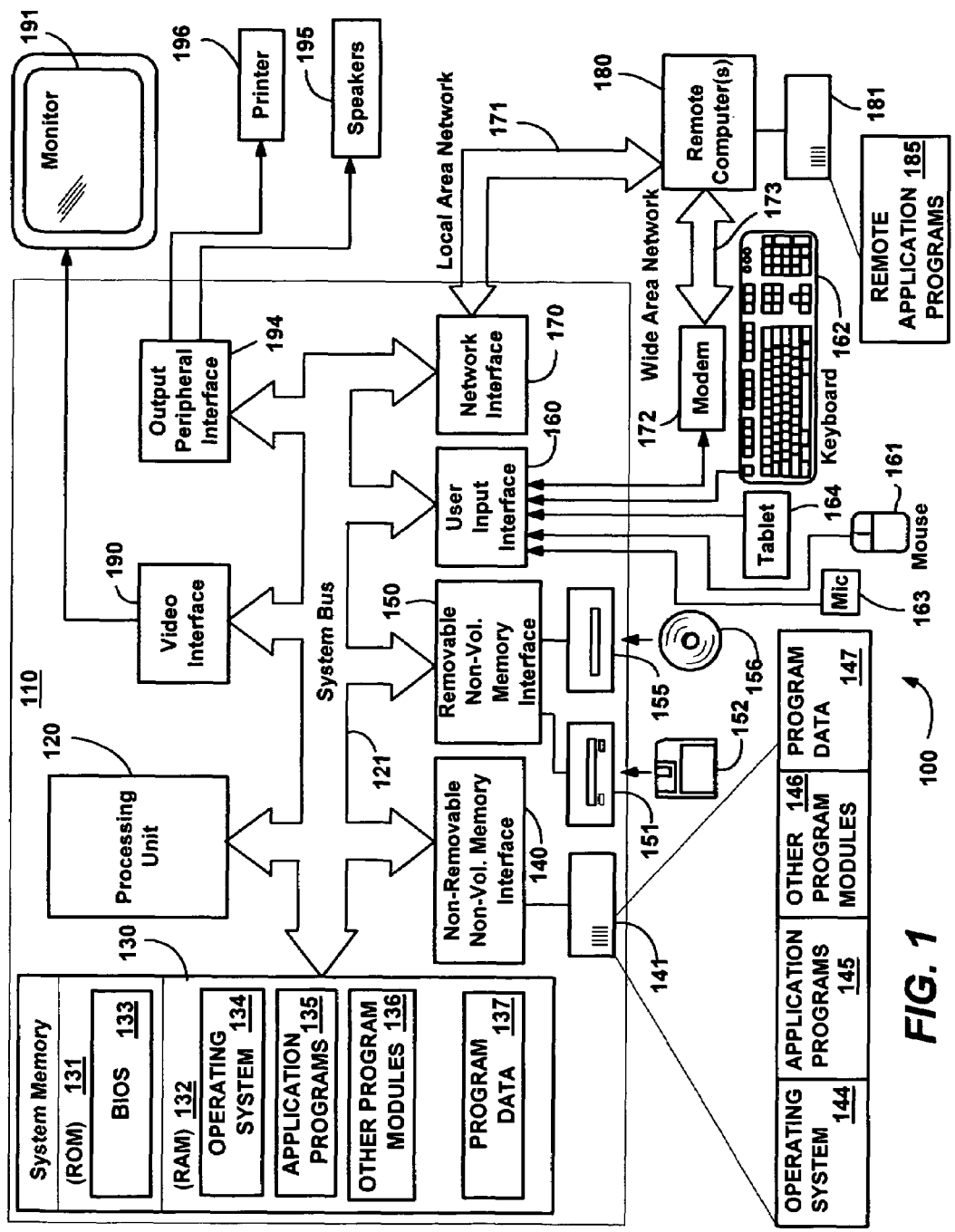
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Fast Booting

Various aspects of the technology described herein are directed towards technology that quickly boots a computing device from an off state, which includes quickly rebooting the computing device. In one example implementation, part of the technology may read data from a solid-state non-volatile RAM storage device, which is faster than retrieving data from a disk, particularly when the disk needs to spin up from an off state. However, as will be understood, the fast boot technology described herein will also ordinarily provide a much quicker booting experience (relative to current boot times) from a hard disk. As such, any of the examples mentioned herein are non-limiting, and the present invention may be used various ways that provide benefits and advantages in computing in general.

In general, on every boot to a full operating system, a computing machine performs much of the same initialization over and over again. Some of these repeated initializations can be relatively time consuming. A fast boot mechanism described herein attempts to reduce the number of these the time-consuming initializations by having at least part of the initializations done only once, e.g., during initial setup of the computing machine, and then persisting the resulting initialized states in a non-volatile form. By quickly restoring these persisted states in subsequent boots, rather than re-computing them each time, a large portion of the boot time is eliminated.

It should be noted that components used during boot have both dynamic data and static data, wherein as used herein, "static" refers to data that is not usually changed between boots, although it may be occasionally changed. As can be readily appreciated, capturing and restoring state data that is dynamic would result in a corrupted system. For example, the file system contains metadata such as cluster bitmaps; as the system is booted and used, new files are created and old files are deleted, whereby a previously captured cluster bitmap is incorrect as to the current state.

In general, the fast boot technology described herein allows components that operate at boot time to preserve and restore their static data, while letting them enumerate their dynamic data as before. Because the individual components know what their static and dynamic states are, the components can identify their static states, and perform dynamic initialization/enumeration on dynamic state data while simply restoring their static state data during a fast boot procedure. In this manner, much of the repetitive initialization that occurs during a slow boot sequence is eliminated.

Some components may be legacy components that are not written to identify and/or preserve static data, or may choose to not participate in a given fast boot scheme for other reasons. In order to allow mixing of participating and non-participating components, an API mechanism is provided such that only those components that are aware of the fast boot will participate by calling the API, while non-participating legacy components and the like will ignore the provided functionality.

Further, because components may have inter-dependencies, initialization takes place in multiple passes; such multi-phase initialization is already structured in Windows®-based operating systems. For example, in an NT kernel, various kernel components (e.g. object, security, process, PnP, executive, kernel, memory management, registry and so forth) have initialization entry points that are called in different initialization phases. In each initialization phase, a component decides what to initialize according to dependencies on the initialization of other components in the previous phases.

To participate in fast boot, in each of the initialization phases, a component can determine which of its initializations take time, and/or whether the initialization work can be done once and the results saved. This information can be provided to a fast boot infrastructure at various times, such as when a new component is installed, or when a computer operating system and its components are setup for the first time. To this end, a device installer or the like enumerates kernel components for fast-boot state information, and calls memory manager/file system components to save the state information in non-volatile form.

Figure 2:
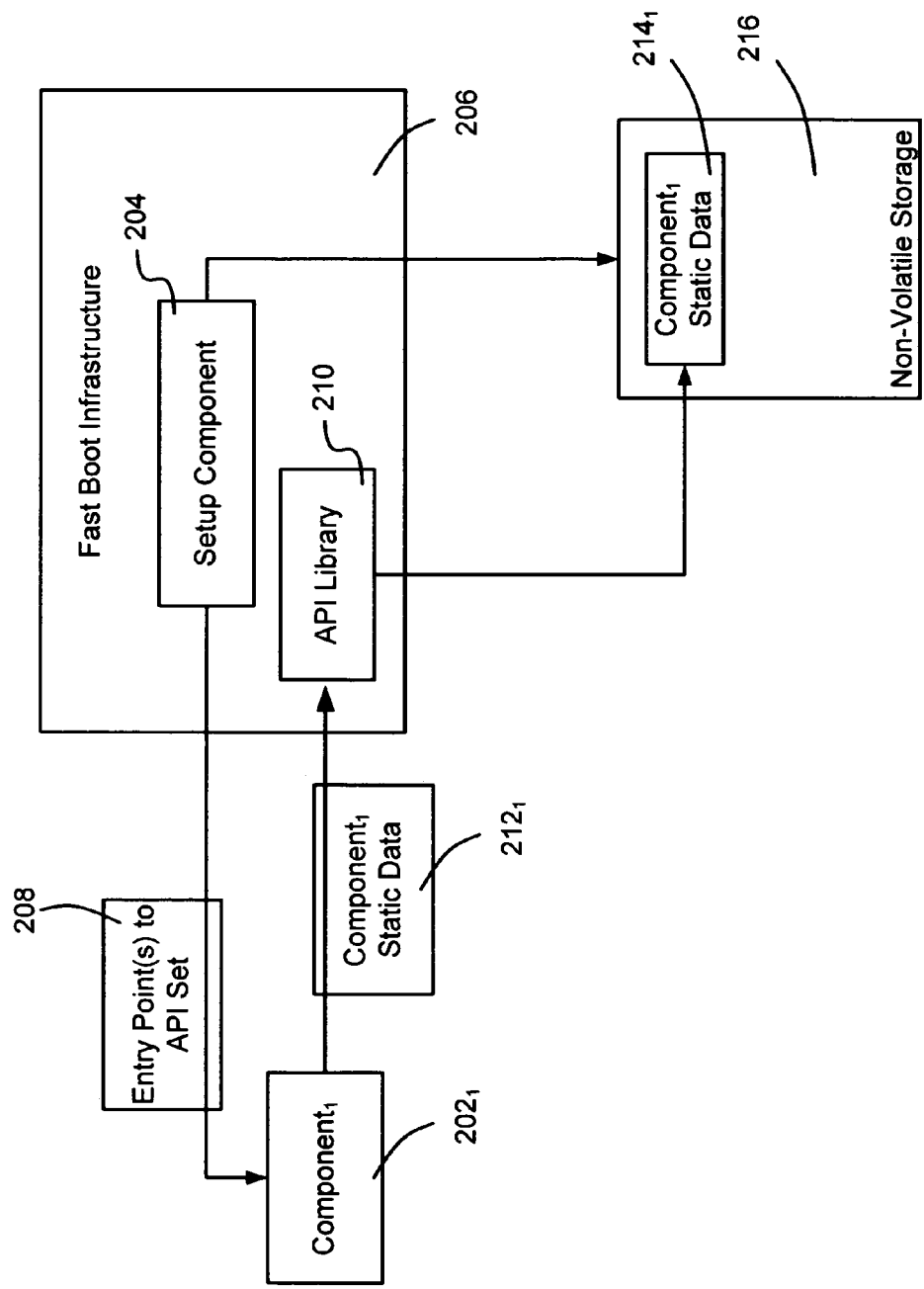
FIG. 2 is a block diagram representing an example architecture for persisting static data, e.g., during system component setup.

For example, as generally represented in FIG. 2, each kernel component (e.g., 202$_1$) may be called by a setup component 204 (associated with or including a device installer) of the fast boot infrastructure 206 at the end of the operating system setup. In one implementation, the call provides the component 202$_1$ with data 208 identifying an entry point (or points), e.g., an application program interface (API), to an API library 210. Via the entry point, the component 202$_1$ may specify the memory locations that contain code and/or static states that can be saved, whereby these memory locations can be restored in subsequent fast boot sessions. Alternatively, the component 202$_1$ can directly provide the data (e.g., in a data structure understood by the component 202$_1$) in response to such a call. The memory locations and/or code or the data itself is represented in FIG. 2 by the "static data" blocks labeled 212$_1$ (as transferred) and 214$_1$ (as persisted). The static code and/or data 214$_1$, comprising a fast boot image, are maintained in some non-volatile storage 216, such as NVRAM or alternatively may be maintained in whole or part in another type of storage medium, such as a hard disk.

Once this data has been persisted, in subsequent boots, when each kernel component is called to initialize, e.g., in different phases, these memory locations (or the data itself) is available for the component to use. As a result, at least certain portions of each participating component's time-consuming initialization can be skipped. Note that for non-participating components, conventional initialization cannot be skipped, whereby that component will consume as much time as it does in a regular long boot.

In one implementation, new interfaces for the kernel components and some new supporting infrastructure in various components are provided. One kernel component interface is provided to allow each kernel component to be called so that it can return a list of memory blocks that contain code and/or data (or the code/data itself). These memory blocks will be saved in the non-volatile storage 216, which can comprise a fast-boot state image file on a hard disk in contemporary computing devices or NVRAM storage or the like in future computing devices.

To build the fast-boot state image, this interface for persisting the static data may be called by the device installer, such as initiated by the operating system setup program. The interface may also be called whenever a new component is installed. It is the responsibility of each participating component to determine what data needs to be saved in order to benefit the boot time of subsequent fast boots. For example, during development, each participating component may perform code profiling on its initialization code path to identify boot bottlenecks.

Another interface is provided to allow the component to receive the list of memory blocks that the component has asked to be persisted, e.g., on a per-phase basis. Note, for example, that this interface may correspond to a modified version of the existing phase initialization interface already present in Windows®-based operating systems. The ability to retrieve static state data allows the component to skip some portion of its time-consuming initializations. A supporting interface is also provided whereby a component can find out if fast-boot is in progress. This interface is provided so that the component can know when to use or not use the cached information from the saved fast-boot state information. Further, kernel components such as a memory manager component, and possibly other components, may export new utility APIs that facilitate the identification and/or the saving of the fast-boot state memory blocks. For example, existing memory allocation APIs may be extended to allow tagging memory allocations that contain fast-boot state information.

Figure 3:
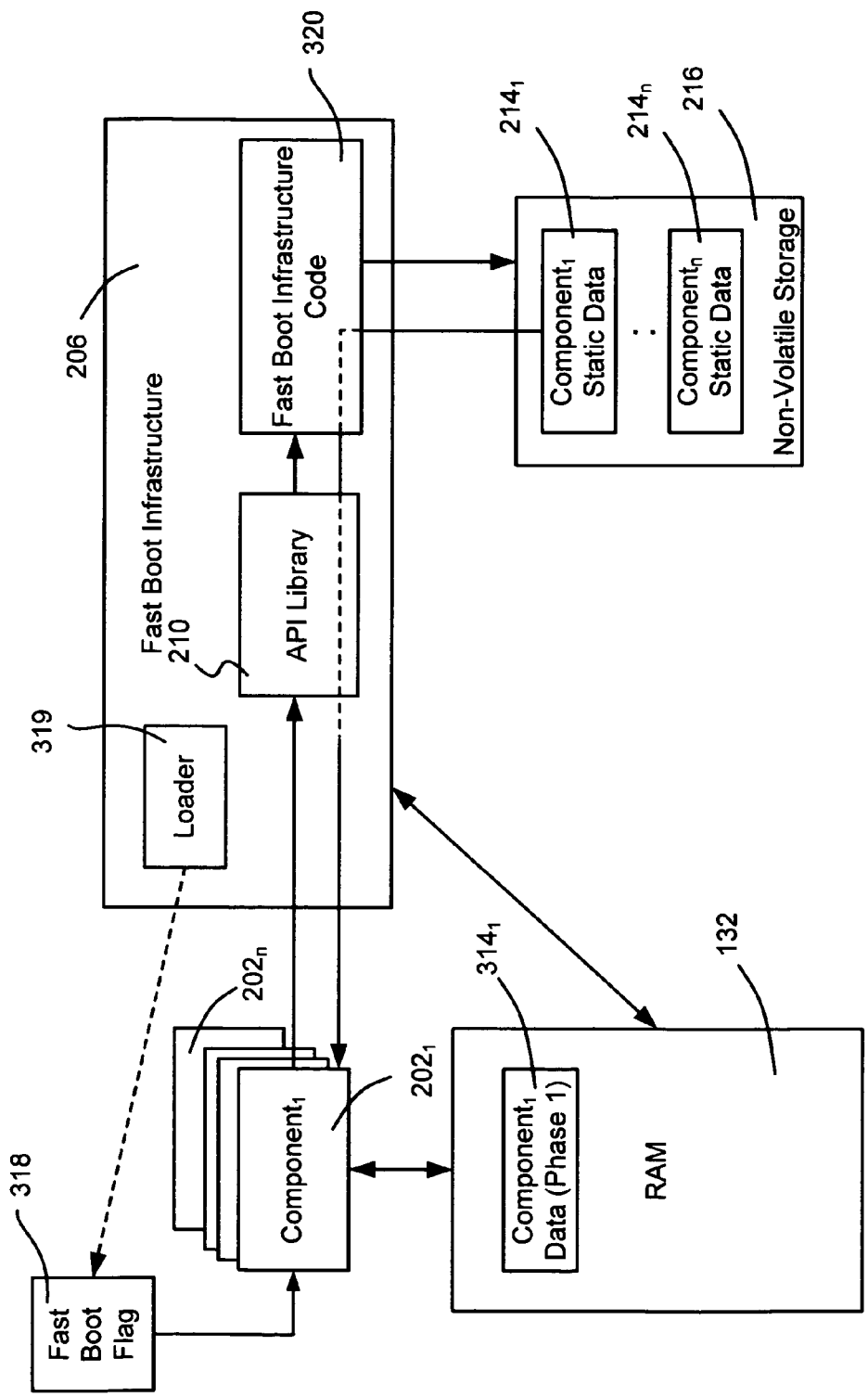
FIG. 3 is a block diagram representing an example architecture for providing a system component with access to its static data, e.g., during a boot operation.

FIG. 3 shows an example in which persisted data in the non-volatile storage is used in a subsequent fast boot operation. In general, when a participating component is called during a fast boot, the component recognizes a fast boot flag 318 (e.g., set in memory, such as by a loader component 319 for a hard disk boot, or by the BIOS for an NVRAM boot). The component (e.g., $202_1$) then calls an API library 210 of the fast boot infrastructure 206 to receive its state data previously cached for the current phase of the boot. Note that the component may actually receive a pointer to its static data decompressed or otherwise transferred to RAM 132 from the non-volatile storage 216; e.g., some or all of the components' various static data may be stored as a fastboot image, decompressed or otherwise transferred to RAM 132 upon startup, and each component provided access thereto via the API call.

Each component (e.g., $202_1$-$202_n$) is called in turn, such as once per phase, and those that participate can thus retrieve access to their static data and enumerate their dynamic data. This is generally represented in FIG. 3 via the data $314_1$ for phase 1 of the component $202_1$ being accessed in RAM 132 by the component $202_1$ upon retrieval from the non-volatile storage 216. Fast boot infrastructure code 320 may process the retrieval upon a call to the API library 210. Those (e.g., legacy) components that do not participate in the fast boot scheme will not call back, as may components that do not have data cached for a particular phase, although such fast-boot-aware components can alternatively return a "no data needed for this phase" response or the like.

Figure 4A:
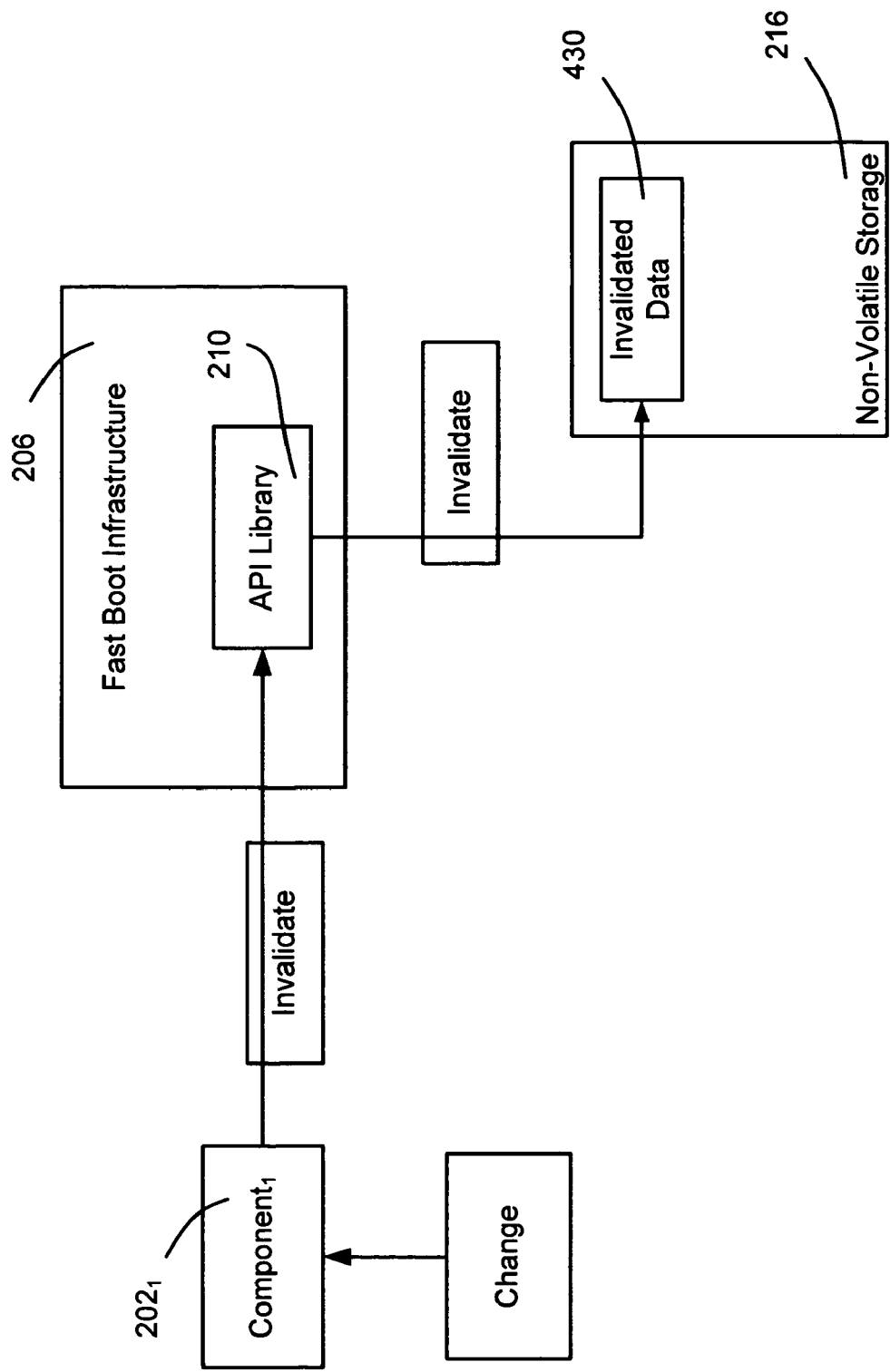
FIGS. 4A and 4B are block diagrams representing an example architecture for invalidating a component's static data upon a change, and changing the static data following a change, respectively.

Turning to FIG. 4A, another example interface in the API library 210 is provided, by which a component (e.g., $202_1$) may notify the fast boot infrastructure code 206 to invalidate some or all of its saved state image because its (typically) static state has changed. For example, a user may change a component's normally static data via control panel and/or registry interaction. The component $202_1$ is responsible for detecting changes to its data. In one implementation, the invalidated data 430 will not be returned, whereby the component $202_1$ will need to enumerate the static data as well as the dynamic data on the next boot, as if in a slow boot operation, and cache valid data again.

Figure 4B:
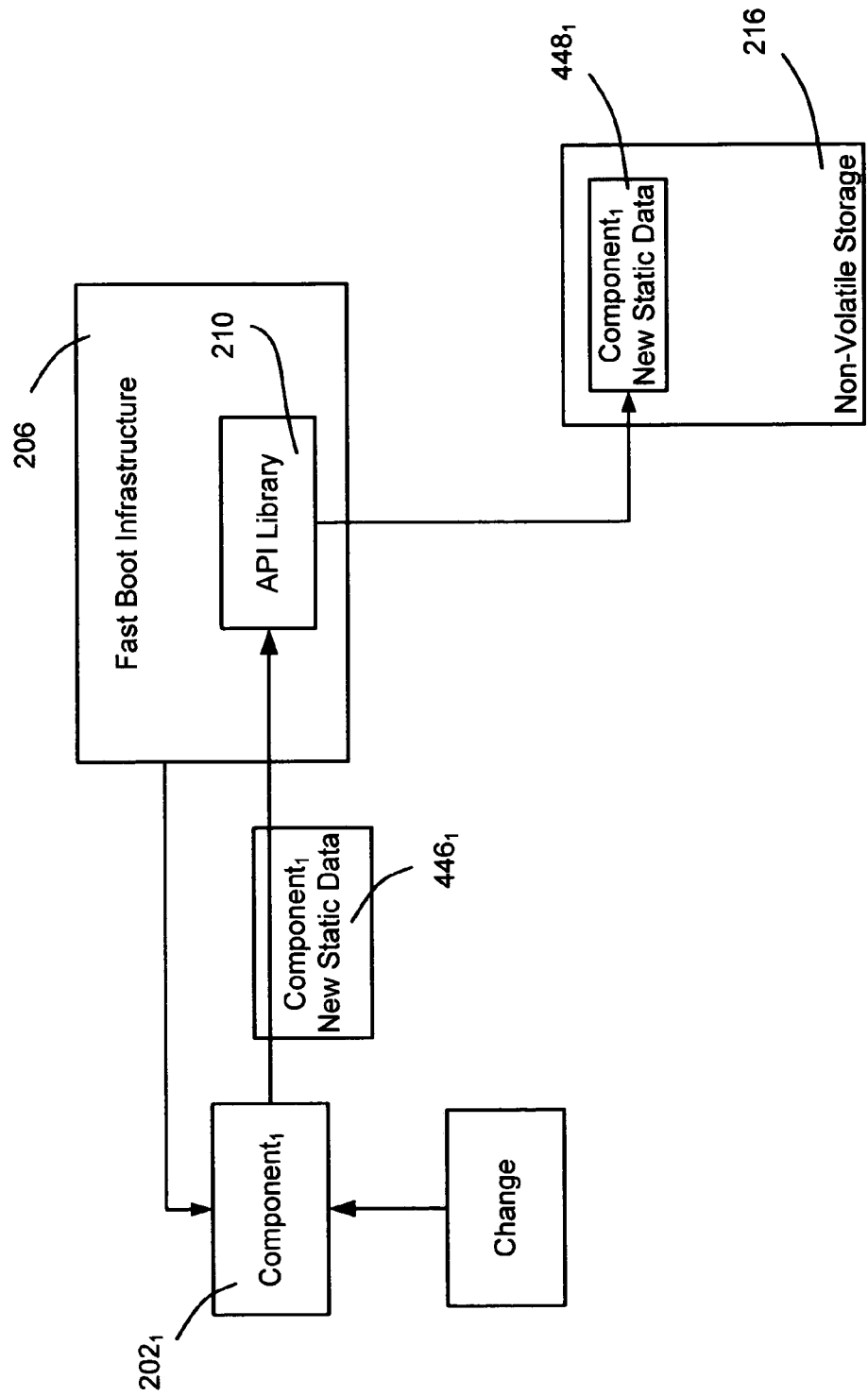

Alternatively, as represented in FIG. 4B by new static state data $446_1$ being transferred and persisted (state data $448_1$), the invalidation of cached fast boot data may initiate a state recapture operation, such as via a silent/background thread 560 (e.g., FIG. 5), which, for example, may operate similarly to the state capture performed by the operating system setup process, as described above. In any alternative, when a change to usually static data occurs, at least the changed portion of the previously cached state data will no longer be used.

Figure 5:
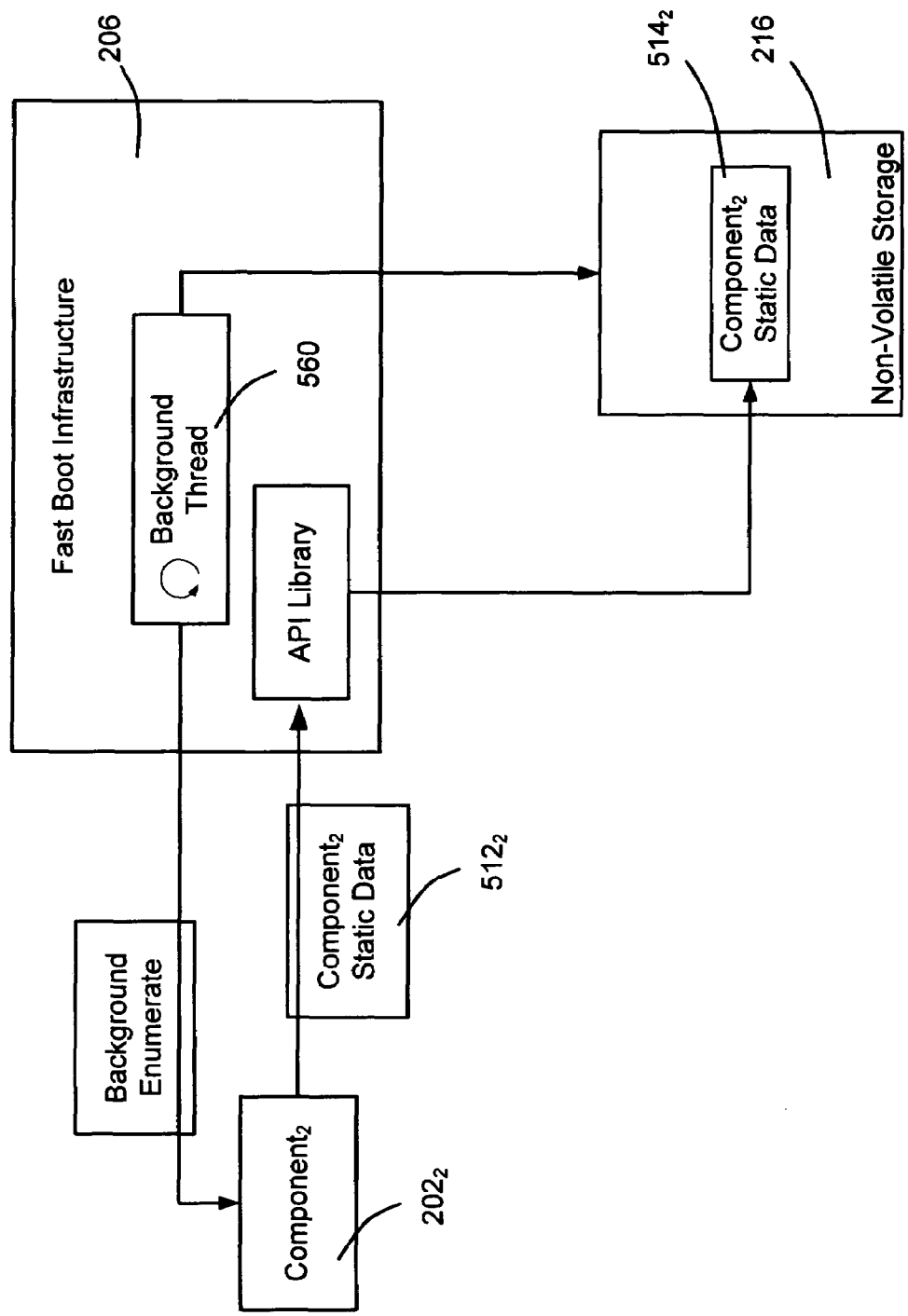
FIG. 5 is a block diagram representing an example architecture for obtaining a system component's static data during a background operation.

Such a background operation, generally represented in FIG. 5, need not only be run when a component detects a change, but instead may be run at other times. For example, part of the current boot time is because of delaying to look for devices (e.g., IDE hard drives) that may have been added by the user; each such device (a computer with two IDE channels may have from one-to-four installed) is given about one second to respond when queried. However, internal drives are not often added or removed, and thus instead of giving each a chance during boot to respond, any change can be detected by a subsequent background operation 560.

Further, it is possible that a component will not be written properly, and may not correctly detect a change to its static data. A background thread/process 560 (FIG. 5) that occasionally requests (e.g., on a random or round-robin basis) that each component re-enumerates its static data may be used to eliminate data corruption due to a missed change. Further, any or all of the components may be occasionally subject to a full, slow-boot enumeration instead of a fast boot, and a user or other mechanism (such as a utility) may request a slow boot if static data corruption is suspected, e.g., from a component's failure to invalidate changed data.

As described above, the fast-boot state information may be stored in some form of solid state non-volatile storage, such as NVRAM. For such devices, a new standardized BIOS interface may be established to specify how the BIOS will retrieve and restore any needed fast-boot state information from the NVRAM to the main memory, e.g., before the operating system takes control.

Figure 6:
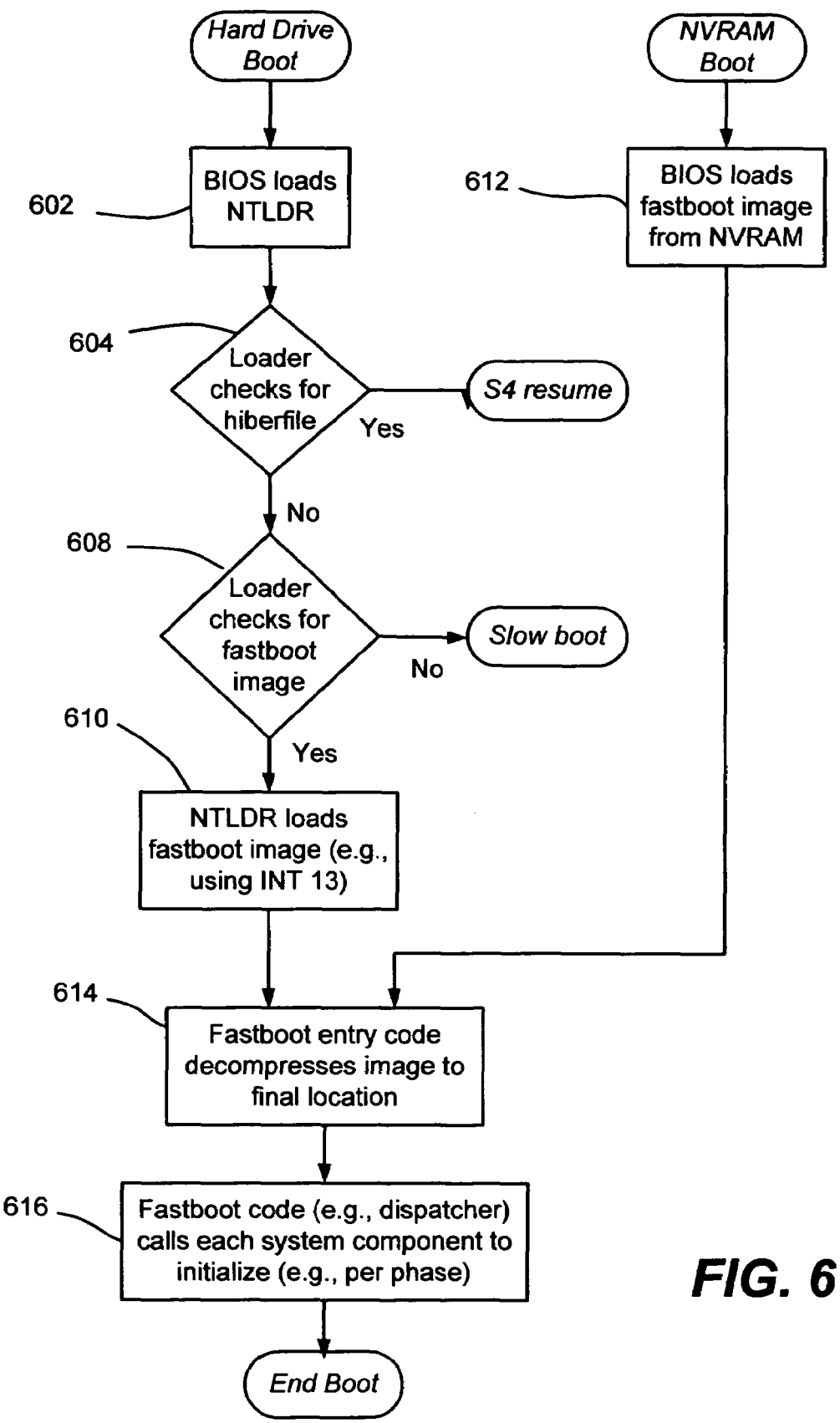
FIG. 6 is a block diagram representing an example fast boot process from hard disk or NVRAM.

FIG. 6 shows an example code path difference between systems that have a fast boot state image stored as a file on a hard drive, and new systems that have the fast boot state image stored in the NVRAM. Note that the computing device (e.g., its BIOS) will know whether it is booting from NVRAM or disk.

Step 602 represents the hard disk boot, which begins by loading and running the loader process, e.g., NTLDR. The loader checks for a valid hibernation file at step 604, and if present, resumes from hibernation (ACPI S4 sleep state). If not present, the loader continues to step 608 where it checks for the presence of a persisted fastboot image.

If not found at step 608, the system will perform a slow (normal long) boot. Note that it is still possible to fast boot next time, such as by obtaining fast boot information from participating components in a background operation, as described above. For example, this may occur if the fast boot image has been deleted for some reason.

If instead at step 608 the boot loader process looks for and finds the fast boot image, it restores the fast-boot state information, e.g., using a BIOS call to load the image to memory.

Step 614 represents decompressing (or otherwise transferring) the image to its final location in RAM 132. Note that for future machines that have NVRAM as at least some of their persistent storage, the BIOS operates at step 612 and 614 to perform the loading without requiring steps 602-610. At step 616, the fastboot code (e.g., a dispatcher) then calls each system component to initialize it, as generally described above with reference to FIG. 3.

In theory, with a fast boot state image stored in NVRAM and most or all kernel components participating, the fast boot time from an off state may approach S3 resume time (typically time to restore the image from the NVRAM plus S3 resume time plus additional dynamic state initialization). With existing technology, this may be on the order of five seconds (assuming 64 MB of NVRAM directly on the PCI bus, which takes under one second to retrieve the entire content to RAM).

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one tangible computer-readable storage medium having stored computer-executable instructions, which when executed on a computing device perform steps for performing a fast boot of a computing device from a fully off state, the computer implemented steps comprising:
   receiving static data and/or code from a system component in a computing device;
   storing the static data and/or code;
   during a subsequent boot of the computing device from a fully off state, indicating to the system component that a fast boot is in progress and providing the system component with access to the static data and/or code; and
   in response to the indication, the system component accessing the static data and/or code such that the system component uses the static data and/or code to restore the system component—s state, wherein as a result of the fast boot, the computing device is in a fully operational state.

2. The computer-readable storage medium of claim 1 wherein providing the system component with access to the static data and/or code comprises providing the system component with an entry point to an application programming interface set of a fast boot infrastructure.

3. The computer-readable storage medium of claim 1 wherein the static data and/or code is maintained in an image in a solid-state memory.

4. The computer-readable storage medium of claim 1 wherein the static data and/or code is maintained in an image on a hard disk drive.

5. The computer-readable storage medium of claim 1 wherein providing the system component with access to the static data and/or code comprises calling the system component for initialization during the subsequent boot.

6. The computer-readable storage medium of claim 5 wherein providing the system component with access to the static data and/or code comprises calling the system component during at least two phases of a plurality of boot phases.

7. The computer-readable storage medium of claim 1 having further stored computer-executable instructions comprising, receiving a call at a fast boot infrastructure from the system component, the call providing the fast boot infrastructure with access to the static data and/or code for persisting for use in the subsequent boot.

8. The computer-readable storage medium of claim 1 having further stored computer-executable instructions comprising, receiving a call at a fast boot infrastructure from the system component, the call corresponding to invalidating the static data so the static data in a current state will not be used in the subsequent boot.

9. The computer-readable storage medium of claim 1 having further stored computer-executable instructions comprising, communicating with the system component in a background operation to provide a fast boot infrastructure with access to the static data and/or code for persisting for use in the subsequent boot.

10. A method implemented on a computer system for performing a fast boot of a computing device from a fully off state, the method comprising:
    receiving static data and/or code from a system component in a computing device;
    storing the static data and/or code;
    during a subsequent boot of the computing device from a fully off state, indicating to the system component that a fast boot is in progress and providing the system component with access to the static data and/or code; and
    in response to the indication, the system component accessing the static data and/or code such that the system component uses the static data and/or code to restore the system component's state, wherein as a result of the fast boot, the computing device is in a fully operational state.

11. The method of claim 10 wherein the static data and/or code is received during an installation operation.

12. The method of claim 10 further comprising, as part of restoring the system component's state, enumerating dynamic data at the system component.

13. The method of claim 10 wherein providing the system component with access to the static data and/or code comprises transferring the static data and/or code from non-volatile storage to volatile memory.

14. The method of claim 10 wherein providing the system component with access to the static data and/or code comprises providing the system component with an entry point to an application programming interface set of a fast boot infrastructure, and wherein indicating to the system component that a fast boot is in progress comprises setting a flag indicative of the fast boot.

15. The method of claim 10 wherein providing the system component with access to the static data comprises calling the system component during at least two phases of a plurality of boot phases.

16. In a computing device, a system that is capable of performing a fast boot from a fully off state, the system comprising:
    a system component and a fast boot infrastructure, the fast boot infrastructure including, a first mechanism for performing the following:
        receiving static data and/or code from a system component in a computing device; and
        storing the static data and/or code; and
    a second mechanism for performing the following:
        during a subsequent boot of the computing device from a fully off state, indicating to the system component that a fast boot is in progress and providing the system component with access to the static data and/or code; and wherein in response to receiving the indication from the second mechanism, the system component accesses the static data and/or code such that the system component uses the static data and/or code to restore the system component's state, wherein as a result of the fast boot, the computing device is in a fully operational state.

17. The system of claim 16 wherein the first mechanism comprises a setup component that registers the system component including providing the system component with an interface set for receiving the static data and/or code.

18. The system of claim 17 wherein the second mechanism comprises code that communicates with the system component via an interface of the interface set.

19. The system of claim 17 wherein the fast boot infrastructure comprises a third mechanism for invalidating the static data.

20. The system of claim 17 wherein the fast boot infrastructure comprises a background mechanism for collecting static data and/or code from the system component.

* * * * *

UNITED STATES PATENT AND TRADEMARK OFFICE
CERTIFICATE OF CORRECTION

| | | |
|---|---|---|
| PATENT NO. | : 7,409,537 B2 | Page 1 of 1 |
| APPLICATION NO. | : 11/245629 | |
| DATED | : August 5, 2008 | |
| INVENTOR(S) | : Michael H. Tsang | |

It is certified that error appears in the above-identified patent and that said Letters Patent is hereby corrected as shown below:

In column 9, line 43, in Claim 1, delete "component—s" and insert -- component's --, therefor.

Signed and Sealed this
Nineteenth Day of April, 2011

David J. Kappos
*Director of the United States Patent and Trademark Office*